United States Patent
Biglino

(10) Patent No.: US 7,216,891 B2
(45) Date of Patent: May 15, 2007

(54) FASTENING DEVICE FOR CURTAIN AIRBAG TETHER

(75) Inventor: Stefano Biglino, Turin (IT)

(73) Assignee: Key Safety Systems, Inc., Sterling Heights, MI (US)

( * ) Notice: Subject to any disclaimer, the term of this patent is extended or adjusted under 35 U.S.C. 154(b) by 304 days.

(21) Appl. No.: 10/872,712

(22) Filed: Jun. 22, 2004

(65) Prior Publication Data

US 2005/0023813 A1 Feb. 3, 2005

(30) Foreign Application Priority Data

Jul. 29, 2003 (EP) .................... 03425510

(51) Int. Cl.
*B60R 21/16* (2006.01)
(52) U.S. Cl. .................... 280/728.2; 24/293; 24/458
(58) Field of Classification Search ............ 280/728.2, 280/743.2, 730.2; 24/294, 295, 458, 293; 411/522, 523
See application file for complete search history.

(56) References Cited

U.S. PATENT DOCUMENTS

| 1,050,416 | A | * | 1/1913 | Alden | 246/476 |
| 1,196,087 | A | * | 8/1916 | Crume | 24/458 |
| 6,106,207 | A | * | 8/2000 | Kuzdak, III | 411/107 |
| RE38,125 | E | * | 5/2003 | Shibata et al. | 280/730.2 |
| 6,848,711 | B2 | * | 2/2005 | Yamamura et al. | 280/730.2 |
| 6,877,766 | B2 | * | 4/2005 | Mikolajewski | 280/728.2 |
| 6,991,256 | B2 | * | 1/2006 | Henderson et al. | 280/730.2 |
| 7,040,647 | B2 | * | 5/2006 | Deligny et al. | 280/728.2 |
| 7,156,413 | B2 | * | 1/2007 | Fischer et al. | 280/728.2 |
| 2002/0105172 | A1 | | 8/2002 | Peer et al. | |
| 2003/0025307 | A1 | | 2/2003 | Hoeft et al. | |
| 2004/0000775 | A1 | * | 1/2004 | Henderson et al. | 280/730.2 |
| 2004/0012172 | A1 | * | 1/2004 | Deligny et al. | 280/728.2 |
| 2005/0046154 | A1 | * | 3/2005 | Rhea et al. | 280/728.2 |

FOREIGN PATENT DOCUMENTS

| EP | 1 279 567 A | 1/2003 |
| GB | 2 367 537 A | 4/2002 |

* cited by examiner

*Primary Examiner*—Paul N. Dickson
*Assistant Examiner*—Drew J. Brown
(74) *Attorney, Agent, or Firm*—Lonnie Drayer

(57) ABSTRACT

A device for fastening a curtain airbag tether to a vehicle structure has a bracket provided with a slot to engage the airbag tether and with a resilient tongue to couple the bracket with the vehicle structure at an opening provided in the vehicle structure.

3 Claims, 2 Drawing Sheets

FASTENING DEVICE FOR CURTAIN AIRBAG TETHER

FIELD OF THE INVENTION

The present invention relates to a fastening device for a curtain airbag tether and in particular it concerns a bracket to fix curtain airbag tethers to a vehicle structure.

BACKGROUND OF THE INVENTION

Airbag devices for side impacts are known as curtain airbags and are usually fixed to the structure of a vehicle above the windows, on the roof panel. Traditionally curtain airbags comprise a folded cushion contained in a housing cover. The cover keeps it folded until the curtain airbag is deployed. To help curtain airbags deploy correctly, they are provided with a tether connected to the vehicle door pillar. Upon impact, the airbag is inflated and deploys downward to protect vehicle occupants from impact against the interior structure and windows of the vehicle and from contact with any glass slivers. The tether leads a curtain airbag to deploy in a correct way.

A commonly used arrangement for fixing the tether to the pillar of the curtain airbag provided door of a vehicle comprises a metal bracket, a nut and a screw. The bracket is provided with a through hole and is fastened to the vehicle structure by means of a screw and a nut, the tether being inserted in a slot of the bracket and being secured to it.

This fixing device firmly attaches the tether to the structure of a vehicle but has high production and assembly costs due to the need of screws and nuts and to the amount of time required for the assembly operation. Moreover the tightening torque of the screw-nut coupling must be checked by the vehicle manufacturer, this further step of the assembly process is time consuming and expensive.

SUMMARY OF THE INVENTION

The present invention relates to a device for fastening a curtain airbag tether to a vehicle structure comprising a bracket provided with a means for engaging a curtain airbag tether and with a means for engaging an opening in said vehicle structure, said means for engaging a vehicle structure comprising a tongue for attaching said bracket to said vehicle structure.

DETAILED DESCRIPTION OF THE INVENTION

Figure 1:
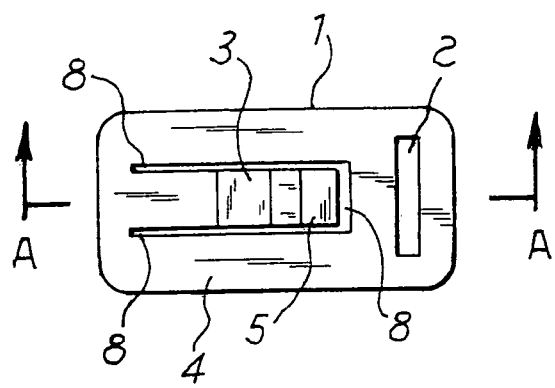
FIG. 1 is a top view of a device for fastening a curtain airbag tether to a vehicle structure according to the present invention.
Figure 2:
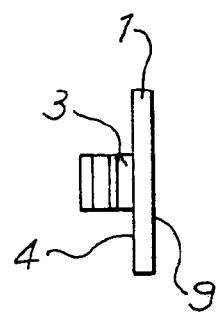
FIG. 2 is a front view of the fastening device of FIG. 1.

With reference to FIGS. 1–4, a device for fastening a curtain airbag tether to a vehicle structure according to the present invention comprises a bracket 1 provided with a slot 2 to attach, for example by sewing, a tether to the bracket. The bracket is provided as well with a means for attaching, i.e. using an interference fit and/or clamping force, the bracket to the vehicle structure. In the shown embodiment said means for attaching are resilient means suitable to engage the vehicle structure and comprise a bracket portion 3 having a tongue shape. Preferably the tongue is integral with the bracket and protrudes from it. The bracket and the tongue are made of stainless steel or any other material having the same, or similar, resilience.

In general, the tongue 3 can be shaped in many different ways, provided that it is suitable to enter and slide into a slot or opening 7 provided in the vehicle structure (see FIGS. 5 and 6), for example on a pillar abutting a window, and to engage the corresponding portion of the vehicle structure between the contact surface 4 of the bracket 1 and the tongue 3.

The tongue 3 must provide, when inserted in the aforesaid opening 7, a clamping force on the metal sheet 10 of the vehicle structure, sufficient to avoid the bracket from disengaging from said slot due to, for example, vibrations or the deployment of the curtain airbag. The tongue portion 3 is preferably integral with the bracket 1 and protrudes from the plane of the bracket 1.

Typically the bracket 1, which comprises the tongue portion 3, is made of stainless steel, high carbon steel, spring steel or any other material having the same, or similar resiliency or rebound, i.e. a resilient performance. A suitable steel is one that complies with standard AISI 301.

In the shown embodiment the tongue 3 has a substantially arch-like shape ending in a clamping distal portion 5 which has to provide the required clamping force on the vehicle structure 10.

Figure 4:
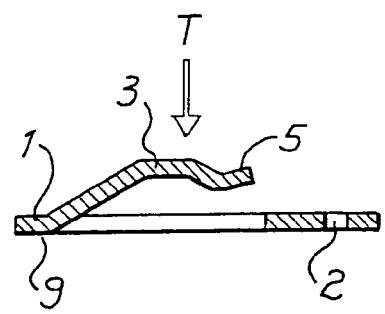
FIG. 4 is a cross section view of the fastening device of FIG. 1 taken at the location indicated as A—A in FIG. 1.

As shown in FIGS. 1 and 4, a slot 2 used to secure the curtain airbag tether to the bracket, is located on the bracket side where the free side, i.e. the distal portion 5 of the tongue 3, is located to concur in avoiding possible disengagement of the bracket from the vehicle structure when the curtain airbag is deployed and the tether is stressed.

Figure 5:
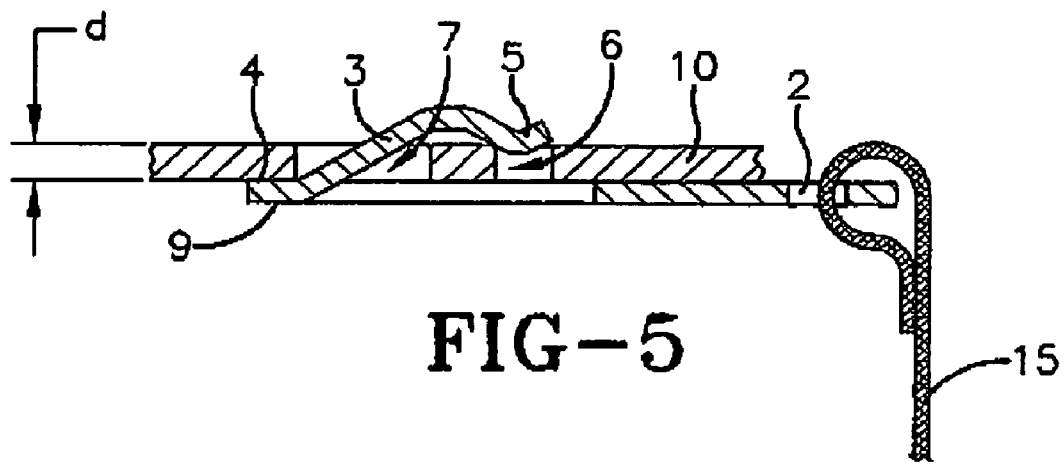
FIG. 5 is a partial sectional view of the fastening device engaged with the structure of a vehicle.

Between the clamping portion 5 of the tongue 3 and the upper surface 4 of the bracket 1 there is provided a clearance C. In order to achieve the aforesaid clamping force, the minimum displacement C in the bracket 1, i.e. the clearance between the distal portion 5 of the tongue 3 and the contact surface 4 of bracket 1, is less than the thickness d of the metal sheet of the vehicle structure 10 (FIG. 5). Preferably the height of displacement or clearance C is equal to or less than half the thickness d of the vehicle structure 10 at the opening or opening 7, i.e. C<0.5d. A suitable value is within the range of about 0.5d to about 3d.

In this way, when tongue 3 is inserted in the opening 7 provided in the vehicle structure, the tongue is deformed by deflection since the vehicle structure is inserted, with a plug-in coupling (i.e. attachment), between the tongue 3 and the bracket surface 4. From this moment on, the tongue 3 clamps, through its portion 5, the sheet metal 10 due to the rebound of the bracket 1 steel.

FIG. 5 shows a further embodiment that provides a snap type coupling between bracket and pillar. In this embodiment the vehicle structure 10 is provided, in addition to the opening 7 through which the tongue is inserted, with a second opening 6. The second opening 6 is spaced from the opening 7 by a length such as to allow the clamping portion 5 to enter the second opening 6 thanks to the elasticity, i.e. resiliency, of the tongue. The clamping portion 5 of the tongue 3 then engages the corresponding second opening 6 provided on the sheet metal of the vehicle through a snap type engagement so to ensure coupling stability.

In general, the bracket 1 can be shaped through different processes. If, as in the above described preferred embodiment, the bracket and the tongue are made of metal, the tongue 3 is produced through shearing and embossing a corresponding portion of the bracket 1. According to a preferred aspect of the process, the shearing and embossing steps are carried out in a direction such as to have very little flash from the shearing step that are in contact with the vehicle structure. In this case, as shown in FIG. 1, the tongue 3 is defined by the trimming lines 8. Usually the trimming process causes flash (not shown) to be present on edges of the trimming lines 8. It is important to avoid flash from contacting the sheet metal of the vehicle structure, because they can damage the anti-corrosion layer of the vehicle and contact the sheet metal of the structure. Since the bracket 1 and the vehicle structure are generally made of different materials, if they contact each other through flash on the bracket 1, a corrosion process of the vehicle structure metal may start.

Figure 3:
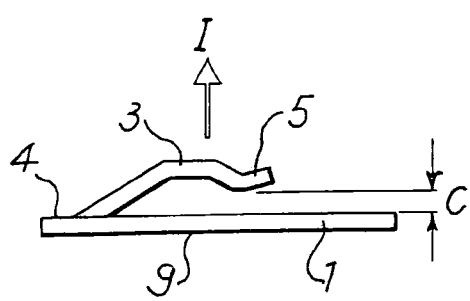
FIG. 3 is a side view of the fastening device of FIG. 1.
Figure 6:
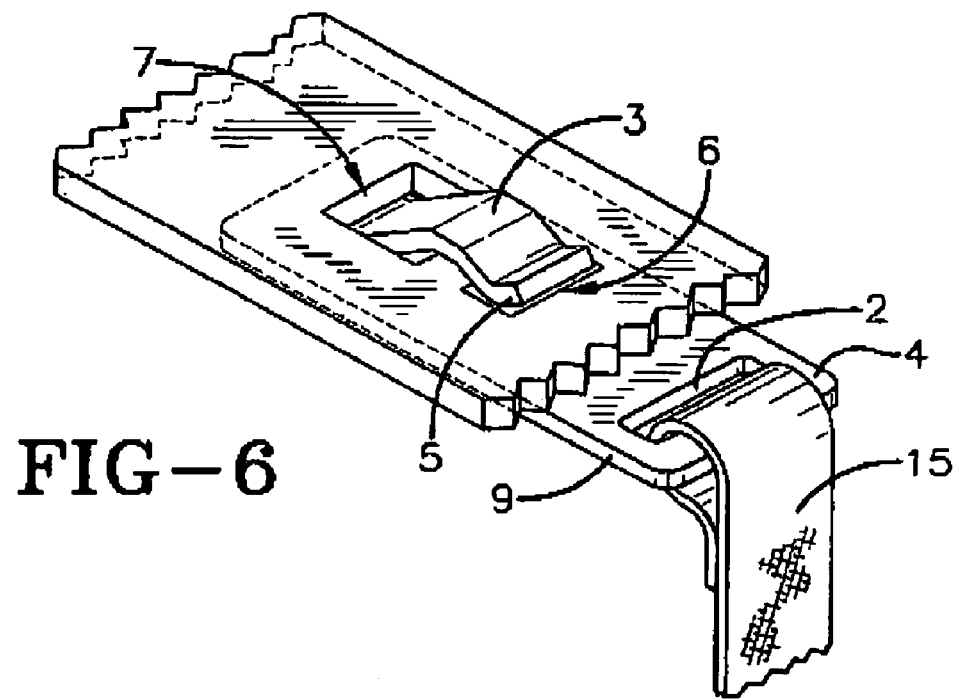
FIG. 6 is a schematic view of the bracket of the fastening device engaging a portion of a vehicle pillar.

For this reason it is preferable to carry out the shearing process along the direction of the arrow T of FIG. 4, and the embossing operation, i.e. shaping process, in the opposite direction shown by the arrow L of FIG. 3. In this way flashes will result on the bottom surface 9 of the bracket 1 and will protrude from it toward the vehicle interior, the surface 4 being the one to contact the vehicle sheet metal as shown in FIG. 6.

The present invention has several advantages with respect to the known art. The attaching, i.e. plug-in coupling, between bracket and a vehicle structure needs neither screws or nuts. This makes it possible to dramatically reduce production, storing and assembly costs of fastenings for curtain airbag tether. Moreover the bracket according to the invention may be provided on the same vehicle structure which has been designed for the nut-screw coupling.

In the foregoing specification, the invention has been described with reference to specific embodiments thereof. It will, however, be evident that various modifications and changes can be made thereto without departing from the broader spirit and scope of the invention as set forth in the appended claims. The specification and drawings are accordingly, to be regarded in an illustrative rather than restrictive sense.

The invention claimed is:

1. An assembly of a curtain airbag tether, a fastening device, and a vehicle structure comprising:
   (a) a vehicle structure having a first opening and a second opening therethrough;
   (b) a bracket provided with a slot therein for engaging a curtain airbag tether and with a tongue for engaging the first and second openings in said vehicle structure; and
   (c) a curtain airbag tether attached to said bracket using said slot in the bracket;
   wherein the vehicle structure has the first and second openings spaced apart by a length so as to pass the tongue of the bracket along with a clamping portion of the tongue through the first opening and to extend a distance along a surface of the vehicle structure to allow the clamping portion of the tongue to enter the second opening due to a resiliency of the tongue to provide a snap type engagement.

2. The assembly of a fastening device and a vehicle structure according to claim 1 wherein the tongue of the fastening device is integral with the bracket.

3. The assembly of a fastening device and a vehicle structure according to claim 1 wherein the fastening device is made of high carbon steel AISI 301.

* * * * *